(12) United States Patent
Candelore

(10) Patent No.: US 9,496,922 B2
(45) Date of Patent: Nov. 15, 2016

(54) PRESENTATION OF CONTENT ON COMPANION DISPLAY DEVICE BASED ON CONTENT PRESENTED ON PRIMARY DISPLAY DEVICE

(71) Applicant: SONY CORPORATION, Tokyo (JP)

(72) Inventor: Brant Candelore, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 296 days.

(21) Appl. No.: 14/257,618

(22) Filed: Apr. 21, 2014

(65) Prior Publication Data

US 2015/0304589 A1    Oct. 22, 2015

(51) Int. Cl.

| | | |
|---|---|---|
| *G06F 3/033* | (2013.01) | |
| *H04B 5/00* | (2006.01) | |
| *H04W 4/00* | (2009.01) | |
| *H04N 21/422* | (2011.01) | |
| *H04N 21/439* | (2011.01) | |
| *H04N 21/44* | (2011.01) | |
| *H04N 21/462* | (2011.01) | |
| *H04N 21/485* | (2011.01) | |
| *H04N 21/658* | (2011.01) | |
| *H04N 21/81* | (2011.01) | |

(52) U.S. Cl.
CPC ........ *H04B 5/0031* (2013.01); *H04N 21/4222* (2013.01); *H04N 21/42209* (2013.01); *H04N 21/42222* (2013.01); *H04N 21/4394* (2013.01); *H04N 21/44008* (2013.01); *H04N 21/4622* (2013.01); *H04N 21/485* (2013.01); *H04N 21/6581* (2013.01); *H04N 21/8126* (2013.01); *H04W 4/008* (2013.01)

(58) Field of Classification Search
CPC .................................................. H04N 5/4403
USPC ....... 725/42, 39, 60; 348/500, 565, 564, 563
See application file for complete search history.

(56) References Cited

U.S. PATENT DOCUMENTS

| | | |
|---|---|---|
| 4,991,027 A | 2/1991 | Enoki |
| 5,367,337 A | 11/1994 | Pyle et al. |
| 5,392,365 A | 2/1995 | Steinkirchner |
| 5,960,114 A | 9/1999 | Dauerer et al. |
| 6,006,265 A | 12/1999 | Rangan et al. |

(Continued)

OTHER PUBLICATIONS

"Syfy Sync for Phone and Tablets"; http://www.syfy.com/sync, website printout Apr. 15, 2014.

(Continued)

*Primary Examiner* — Jefferey Harold
*Assistant Examiner* — Omer Khalid
(74) *Attorney, Agent, or Firm* — John L. Rogitz; John M. Rogitz

(57) ABSTRACT

In one aspect, a first device includes a display, at least one computer readable storage medium bearing instructions executable by a processor, and at least one processor configured for accessing the computer readable storage medium to execute the instructions. The instructions configure the processor to acquire data pertaining to first content presented on a second device, determine information pertaining to the first content based on the data, identify second content related to but different from the first content at least in part based on the information, and present a user interface (UI) on the display manipulable to issue a command to at least one of the first and second devices to present the second content responsive to the identification of the second content.

19 Claims, 5 Drawing Sheets

(56) References Cited

U.S. PATENT DOCUMENTS

| | | |
|---|---|---|
| 6,008,693 A | 12/1999 | Heinke |
| 6,021,386 A | 2/2000 | Davis et al. |
| 6,026,437 A | 2/2000 | Muschett et al. |
| 6,058,236 A | 5/2000 | Peters et al. |
| 6,285,381 B1 | 9/2001 | Sawano et al. |
| 6,301,366 B1 | 10/2001 | Malcolm, Jr. et al. |
| 6,314,330 B1 | 11/2001 | Matthews |
| 6,373,954 B1 | 4/2002 | Malcolm, Jr. et al. |
| 6,405,093 B1 | 6/2002 | Malcolm, Jr. et al. |
| 6,438,545 B1 | 8/2002 | Beauregard et al. |
| 6,452,615 B1 | 9/2002 | Chiu et al. |
| 6,567,130 B1 | 5/2003 | Shulz |
| 6,628,999 B1 | 9/2003 | Klaas et al. |
| 6,690,826 B2 | 2/2004 | Slavin |
| 6,735,338 B1 | 5/2004 | Conklin |
| 6,845,161 B2 | 1/2005 | Boss |
| 6,882,734 B2 | 4/2005 | Watson et al. |
| 6,922,487 B2 | 7/2005 | Dance et al. |
| 6,952,621 B1 | 10/2005 | Malcolm, Jr. et al. |
| 6,992,727 B2 | 1/2006 | Lin et al. |
| 6,993,190 B1 | 1/2006 | Nguyen |
| 7,080,394 B2 | 7/2006 | Istvan et al. |
| 7,167,191 B2 | 1/2007 | Hull et al. |
| 7,176,794 B2 | 2/2007 | Fairhurst et al. |
| 7,233,545 B2 | 6/2007 | Harvey, Jr. et al. |
| 7,251,413 B2 | 7/2007 | Dow et al. |
| 7,299,405 B1 | 11/2007 | Lee et al. |
| 7,432,940 B2 | 10/2008 | Brook et al. |
| 7,446,817 B2 | 11/2008 | Jung et al. |
| 7,506,243 B2 | 3/2009 | Kotler et al. |
| 7,549,115 B2 | 6/2009 | Kotler et al. |
| 7,554,576 B2 | 6/2009 | Erol et al. |
| 7,570,816 B2 | 8/2009 | Bargeron et al. |
| 7,599,580 B2 | 10/2009 | King et al. |
| 7,630,888 B2 | 12/2009 | Bichsel |
| 7,653,925 B2 | 1/2010 | Hull et al. |
| 7,669,127 B2 | 2/2010 | Hull et al. |
| 7,669,198 B2 | 2/2010 | Chitale |
| 7,672,839 B2 | 3/2010 | Young |
| 7,673,227 B2 | 3/2010 | Kotler et al. |
| 7,689,613 B2 | 3/2010 | Candelore |
| 7,689,712 B2 | 3/2010 | Lee et al. |
| 7,694,226 B2 | 4/2010 | Covannon et al. |
| 7,702,678 B2 | 4/2010 | Teague |
| 7,757,253 B2 | 7/2010 | Rappaport et al. |
| 7,812,860 B2 | 10/2010 | King et al. |
| 7,831,912 B2 | 11/2010 | King et al. |
| 7,884,714 B2 | 2/2011 | Fein et al. |
| 7,928,310 B2 | 4/2011 | Georges et al. |
| 7,966,494 B2 | 6/2011 | Rhoads |
| 7,971,071 B2 | 6/2011 | Walkoe et al. |
| 7,975,227 B2 | 7/2011 | Covannon et al. |
| 7,982,805 B2 | 7/2011 | Caviedes et al. |
| 8,050,415 B2 | 11/2011 | Wang |
| 8,079,055 B2 | 12/2011 | Hardacker et al. |
| 8,098,832 B2 | 1/2012 | Lin |
| 8,116,463 B2 | 2/2012 | Wang |
| 8,125,532 B2 | 2/2012 | Sugeno et al. |
| 8,139,793 B2 | 3/2012 | Mao |
| 8,145,496 B2 | 3/2012 | Transeau |
| 8,149,156 B1 | 4/2012 | Allred et al. |
| 8,153,878 B2 | 4/2012 | Chevreau et al. |
| 8,170,241 B2 | 5/2012 | Roe et al. |
| 8,184,137 B2 | 5/2012 | Neuman |
| 8,219,146 B2 | 7/2012 | Connors et al. |
| 8,224,157 B2 | 7/2012 | Nam et al. |
| 8,233,642 B2 | 7/2012 | Mao |
| 8,247,676 B2 | 8/2012 | Georges et al. |
| 8,248,237 B2 | 8/2012 | Fitzgerald et al. |
| 8,270,801 B2 | 9/2012 | Ge |
| 8,295,672 B2 | 10/2012 | Lee et al. |
| 8,296,808 B2 | 10/2012 | Hardacker et al. |
| 8,320,674 B2 | 11/2012 | Guillou et al. |
| 8,375,303 B2 | 2/2013 | Covannon et al. |
| 8,391,541 B2 | 3/2013 | Rhoads |
| 8,392,006 B2 | 3/2013 | Gehring et al. |
| 8,429,287 B2 | 4/2013 | Sullivan |
| 8,438,589 B2 | 5/2013 | Candelore |
| 8,442,331 B2 | 5/2013 | King et al. |
| 8,482,670 B2 | 7/2013 | Caviedes et al. |
| 8,489,404 B2 | 7/2013 | Lin et al. |
| 8,490,128 B2 | 7/2013 | Davis et al. |
| 8,497,841 B1 | 7/2013 | Sze et al. |
| 8,499,253 B2 | 7/2013 | Liu et al. |
| 8,503,780 B2 | 8/2013 | Chung et al. |
| 8,505,090 B2 | 8/2013 | King et al. |
| 8,509,736 B2 | 8/2013 | Hodge |
| 8,516,533 B2 | 8/2013 | Davis et al. |
| 8,528,036 B2 | 9/2013 | Davis et al. |
| 8,564,685 B2 | 10/2013 | Sugeno et al. |
| 8,584,033 B2 | 11/2013 | Liu et al. |
| 8,588,529 B2 | 11/2013 | Nykyforov |
| 8,619,147 B2 | 12/2013 | King et al. |
| 8,621,349 B2 | 12/2013 | King et al. |
| 8,621,498 B2 | 12/2013 | Candelore |
| 8,644,689 B2 | 2/2014 | Matthews et al. |
| 8,660,355 B2 | 2/2014 | Rodriguez et al. |
| 8,660,835 B2 | 2/2014 | Mausaad |
| 8,660,970 B1 | 2/2014 | Fiedorowicz |
| 2002/0081030 A1 | 6/2002 | Slavin |
| 2002/0085726 A1 | 7/2002 | Fuqua |
| 2002/0156774 A1 | 10/2002 | Beauregard et al. |
| 2002/0172373 A1 | 11/2002 | Boss |
| 2003/0074662 A1 | 4/2003 | Istvan et al. |
| 2003/0086615 A1 | 5/2003 | Dance et al. |
| 2003/0122954 A1 | 7/2003 | Kassatly |
| 2003/0138975 A1 | 7/2003 | Quirk |
| 2003/0174218 A1 | 9/2003 | Battles et al. |
| 2003/0202772 A1 | 10/2003 | Dow et al. |
| 2003/0221192 A1 | 11/2003 | Rappaport et al. |
| 2004/0030741 A1 | 2/2004 | Wolton et al. |
| 2004/0140973 A1 | 7/2004 | Zanaty |
| 2004/0181403 A1 | 9/2004 | Hsu |
| 2005/0146642 A1 | 7/2005 | Fairhurst et al. |
| 2005/0162513 A1 | 7/2005 | Chan |
| 2005/0195898 A1 | 9/2005 | Moon et al. |
| 2005/0196043 A1 | 9/2005 | Jung et al. |
| 2005/0216452 A1 | 9/2005 | Teague |
| 2005/0216528 A1 | 9/2005 | Cheng |
| 2005/0216825 A1 | 9/2005 | Teague |
| 2005/0216837 A1 | 9/2005 | Washburn |
| 2005/0240489 A1 | 10/2005 | Lambert |
| 2006/0023871 A1 | 2/2006 | Shaffer et al. |
| 2006/0026078 A1 | 2/2006 | King et al. |
| 2006/0036585 A1 | 2/2006 | King et al. |
| 2006/0039464 A1 | 2/2006 | Emerson et al. |
| 2006/0050610 A1 | 3/2006 | Harvey, Jr. et al. |
| 2006/0098899 A1 | 5/2006 | King et al. |
| 2006/0100877 A1 | 5/2006 | Zhang et al. |
| 2006/0130006 A1 | 6/2006 | Chitale |
| 2006/0222239 A1 | 10/2006 | Bargeron et al. |
| 2006/0269073 A1 | 11/2006 | Mao |
| 2006/0280312 A1 | 12/2006 | Mao |
| 2006/0285699 A1 | 12/2006 | Fuqua |
| 2007/0053664 A1 | 3/2007 | Sugeno et al. |
| 2007/0070196 A1 | 3/2007 | Caviedes et al. |
| 2007/0139559 A1 | 6/2007 | Neuman |
| 2007/0168315 A1 | 7/2007 | Covannon et al. |
| 2007/0260580 A1 | 11/2007 | Omoigui |
| 2008/0131084 A1 | 6/2008 | Rhoads |
| 2008/0167867 A1 | 7/2008 | Fein et al. |
| 2008/0260185 A1 | 10/2008 | Tseng et al. |
| 2008/0294622 A1 | 11/2008 | Kanigsberg et al. |
| 2009/0077658 A1 | 3/2009 | King et al. |
| 2009/0119169 A1 | 5/2009 | Chandratillake et al. |
| 2009/0231474 A1 | 9/2009 | Ludwig |
| 2009/0232346 A1 | 9/2009 | Zilch |
| 2009/0240647 A1 | 9/2009 | Green et al. |
| 2009/0254510 A1 | 10/2009 | Omoigui |
| 2009/0281793 A1 | 11/2009 | Transeau |
| 2009/0285482 A1 | 11/2009 | Epshtein et al. |
| 2009/0313055 A1 | 12/2009 | Martin et al. |
| 2009/0316864 A1 | 12/2009 | Fitzsimmons |
| 2010/0019715 A1 | 1/2010 | Roe et al. |

(56) References Cited

U.S. PATENT DOCUMENTS

| | | |
|---|---|---|
| 2010/0063892 A1 | 3/2010 | Keronen et al. |
| 2010/0092095 A1 | 4/2010 | King et al. |
| 2010/0124276 A1 | 5/2010 | Zhou |
| 2010/0134275 A1 | 6/2010 | Fitzgerald et al. |
| 2010/0134299 A1 | 6/2010 | Fitzgerald et al. |
| 2010/0138297 A1 | 6/2010 | Fitzgerald et al. |
| 2010/0138298 A1 | 6/2010 | Fitzgerald et al. |
| 2010/0138749 A1 | 6/2010 | Covannon et al. |
| 2010/0142914 A1 | 6/2010 | Zhao |
| 2010/0177970 A1 | 7/2010 | King et al. |
| 2010/0205628 A1 | 8/2010 | Davis et al. |
| 2010/0242068 A1 | 9/2010 | Rappaport et al. |
| 2010/0247073 A1 | 9/2010 | Nam et al. |
| 2010/0281178 A1 | 11/2010 | Sullivan |
| 2010/0290632 A1 | 11/2010 | Lin |
| 2010/0312833 A1 | 12/2010 | Rimmer et al. |
| 2010/0314631 A1 | 12/2010 | Ludwig |
| 2011/0018998 A1 | 1/2011 | Guzik |
| 2011/0026838 A1 | 2/2011 | King et al. |
| 2011/0047148 A1 | 2/2011 | Omoigui |
| 2011/0078745 A1 | 3/2011 | Macrae et al. |
| 2011/0085211 A1 | 4/2011 | King et al. |
| 2011/0091043 A1 | 4/2011 | Wang |
| 2011/0097054 A1 | 4/2011 | Lee et al. |
| 2011/0105226 A1 | 5/2011 | Perlman |
| 2011/0106524 A1 | 5/2011 | Mousaad |
| 2011/0111741 A1 | 5/2011 | Connors et al. |
| 2011/0134763 A1 | 6/2011 | Medina et al. |
| 2011/0138416 A1* | 6/2011 | Kang ............... G06F 3/0482 725/39 |
| 2011/0158532 A1 | 6/2011 | Chung et al. |
| 2011/0161076 A1 | 6/2011 | Davis et al. |
| 2011/0194702 A1 | 8/2011 | Wang |
| 2011/0242424 A1 | 10/2011 | Caviedes et al. |
| 2011/0244919 A1 | 10/2011 | Aller et al. |
| 2011/0246205 A1 | 10/2011 | Lin et al. |
| 2011/0246513 A1 | 10/2011 | Cavannon et al. |
| 2011/0268423 A1 | 11/2011 | Ge |
| 2011/0281566 A1 | 11/2011 | Davis et al. |
| 2011/0283305 A1 | 11/2011 | Davis et al. |
| 2011/0283306 A1 | 11/2011 | Davis et al. |
| 2011/0283310 A1 | 11/2011 | Davis et al. |
| 2011/0283319 A1 | 11/2011 | Davis et al. |
| 2011/0283328 A1 | 11/2011 | Davis et al. |
| 2011/0283329 A1 | 11/2011 | Davis et al. |
| 2011/0307084 A1 | 12/2011 | Gehring et al. |
| 2012/0133792 A1 | 5/2012 | Sugeno et al. |
| 2012/0151577 A1 | 6/2012 | King et al. |
| 2012/0191246 A1 | 7/2012 | Roe et al. |
| 2012/0237908 A1 | 9/2012 | Fitzgerald et al. |
| 2012/0257104 A1 | 10/2012 | Oh et al. |
| 2012/0288103 A1 | 11/2012 | van Staalduinen et al. |
| 2012/0295510 A1 | 11/2012 | Boeckle |
| 2012/0300643 A1 | 11/2012 | Field |
| 2013/0033641 A1 | 2/2013 | Shih |
| 2013/0051765 A1 | 2/2013 | Matthews et al. |
| 2013/0095924 A1 | 4/2013 | Geisner et al. |
| 2013/0106979 A1 | 5/2013 | Chang et al. |
| 2013/0110547 A1 | 5/2013 | Englund et al. |
| 2013/0110900 A1* | 5/2013 | Des Jardins ....... H04N 21/4307 709/201 |
| 2013/0145240 A1 | 6/2013 | Anderson et al. |
| 2013/0147686 A1 | 6/2013 | Clavin et al. |
| 2013/0152139 A1 | 6/2013 | Davis et al. |
| 2013/0167173 A1 | 6/2013 | Davis et al. |
| 2013/0177252 A1 | 7/2013 | Hefeeda et al. |
| 2013/0201527 A1 | 8/2013 | King et al. |
| 2013/0219426 A1 | 8/2013 | Zweig et al. |
| 2013/0222369 A1 | 8/2013 | Huston et al. |
| 2013/0246128 A1 | 9/2013 | King et al. |
| 2013/0272672 A1 | 10/2013 | Padro Rondon et al. |
| 2013/0286153 A1 | 10/2013 | Williams, IV et al. |
| 2013/0298179 A1 | 11/2013 | Baum et al. |
| 2013/0308773 A1 | 11/2013 | Rodriguez Marchant |
| 2013/0317861 A1 | 11/2013 | Tofte et al. |
| 2013/0317863 A1 | 11/2013 | Tofte et al. |
| 2013/0317864 A1 | 11/2013 | Tofte et al. |
| 2013/0317865 A1 | 11/2013 | Tofte et al. |
| 2013/0318157 A1 | 11/2013 | Harrison |
| 2013/0326465 A1 | 12/2013 | Jain et al. |
| 2013/0326467 A1 | 12/2013 | Nair et al. |
| 2013/0339996 A1 | 12/2013 | Davis et al. |
| 2013/0340003 A1 | 12/2013 | Davis et al. |
| 2013/0342571 A1 | 12/2013 | Kinnebrew et al. |
| 2013/0342740 A1 | 12/2013 | Govindarao |
| 2014/0006948 A1 | 1/2014 | Yang et al. |
| 2014/0025573 A1 | 1/2014 | Keronen et al. |
| 2014/0046878 A1 | 2/2014 | Lecomte et al. |
| 2014/0047413 A1 | 2/2014 | Sheive et al. |
| 2014/0050454 A1 | 2/2014 | Slotte |
| 2014/0056172 A1 | 2/2014 | Lee et al. |
| 2014/0056451 A1 | 2/2014 | El-Hoiydi et al. |
| 2014/0059587 A1 | 2/2014 | Davis et al. |
| 2015/0193069 A1* | 7/2015 | Di Censo ................ G06F 3/017 345/173 |

OTHER PUBLICATIONS

Apple, "iOS Security Manual" Feb. 2014, pp. 1-33.
Wikipedia, "AirDrop" definition pp. 1-3, website printout Apr. 8, 2014. http://en.wikipedia.org/wiki/AirDrop.
Matt Hamblen, "What Apple's new AirDrop data sharing says about NFC", http://www.computerworld.com/s/article/9239971/What_Apple_s_new_AirDrop_data_sharing_says_about_NFC, published Jun. 11, 2013.

* cited by examiner

PRESENTATION OF CONTENT ON COMPANION DISPLAY DEVICE BASED ON CONTENT PRESENTED ON PRIMARY DISPLAY DEVICE

FIELD OF THE INVENTION

The application relates generally to determining content to present on a companion display device based on content presented on a primary display device.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

An example ecosystem that is pertinent here is a home entertainment ecosystem that includes a TV and various nearby display devices such as wireless communication devices.

SUMMARY OF THE INVENTION

As understood herein, to pair the TV with a device in the home ecosystem for use as a "companion" device to the TV, typically a user must select a device from a long list of ecosystem devices, in the home and in many cases those in neighboring homes, which might have been discovered wirelessly. Usually, it is up to the user (a human) to figure out which devices are in the home let alone the same room.

Present principles are directed to allowing companion screen devices (CSDs), e.g., tablet computers, wireless telephones, and the like to discover and communicate with a primary display device (PDD) such as an audio video display device (AVDD) such as a TV when not just both present in the home ecosystem but also when both the CSD and PPD may be in the same room.

It should be noted that a PDD may be established by a device with a relatively small display such as a wireless tablet, if it is the device of focus with primary content that is playing. In this scenario, the CSD may be established by, for example, a larger screen TV without affecting present principles.

Accordingly, in a first aspect a first device includes a display, at least one computer readable storage medium bearing instructions executable by a processor, and at least one processor configured for accessing the computer readable storage medium to execute the instructions. The instructions configure the processor to acquire data pertaining to first content presented on a second device, determine information pertaining to the first content based on the data, identify second content related to but different from the first content at least in part based on the information; and present a user interface (UI) on the display manipulable to issue a command to at least one of the first and second devices to present the second content responsive to the identification of the second content. The second content is ancillary content to the first content.

In some embodiments and responsive to receiving the command at the second device based at least in part on manipulation of the UI, the instructions may configure the processor to present the second content on the first device, present the second content on the second device, and/or present the second content on a third device different from the first and second devices. Furthermore, if desired the data may be acquired at least in part based on sound detected at a microphone on first device, and/or acquired at least in part based on at least one image of the first content detected by a camera on first device.

In addition, in some embodiments and at least in part based on the information, the instructions may configure the processor to identify at least second content and third content different from the second content where both are related to but different from the first content, and responsive to the identification of the second content and the third content, present the UI on the display where the UI provides respective information on each of the second content and third content. Further, in such embodiments the UI may include a first selector element selectable to automatically without further input issue a first command to at least one of the first and second devices to present the second content, and may include a second selector element selectable to automatically without further user input issue a second command to at least one of the first and second devices to present the third content. What's more, the UI may also include at least one selector element associated with content unrelated to the first content and unrelated to the second content that is selectable to present the unrelated content.

Also in some embodiments, the determination of information pertaining to the first content may include determining the identity of the first content based on the data and may be executed at least in part based on an Internet search using at least a portion of the data. In addition, if desired the Internet search using at least a portion of the data may be an Internet search of at least one image of the first content as gathered by a camera on first device.

Even further, in some embodiments the acquisition of data may include acquiring data pertaining to a watermark where the watermark is included on at least one image of the first content presented on the second device. In addition to or in lieu of the foregoing, the acquisition of data may include acquiring data pertaining to an audiomark of audio of the first content. Also in addition to or in lieu of the foregoing, the data may pertain to text associated with the first content, where the text may be presented on an on screen display (OSD) of the second device and/or be of closed captioning of the first content presented on the second device. The text may be acquired based at least in part on optical character recognition.

In another aspect, a method includes initiating a content detection application at a first device, collecting at least in part using the application data at the first device pertaining to first content presented on a second device different from the first device, determining second content related to but different from the first content at least in part based on the data, and presenting a user interface (UI) on a display of the first device including information pertaining to the second content based on the determination of second content and without input from a user. The second content is ancillary content to the first content.

In still another aspect, a computer readable storage medium that is not a carrier wave bears instructions which when executed by a processor of a first device configure the processor to acquire data pertaining to a segment of first content presented on a second device different from the first device, identify second content related to but different from the first content at least in part based on the data, and responsive to the identification of the second content and without user input to present information on the first device pertaining to the first content, present on the first device information pertaining to the second content and/or present on the first device the second content.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1:
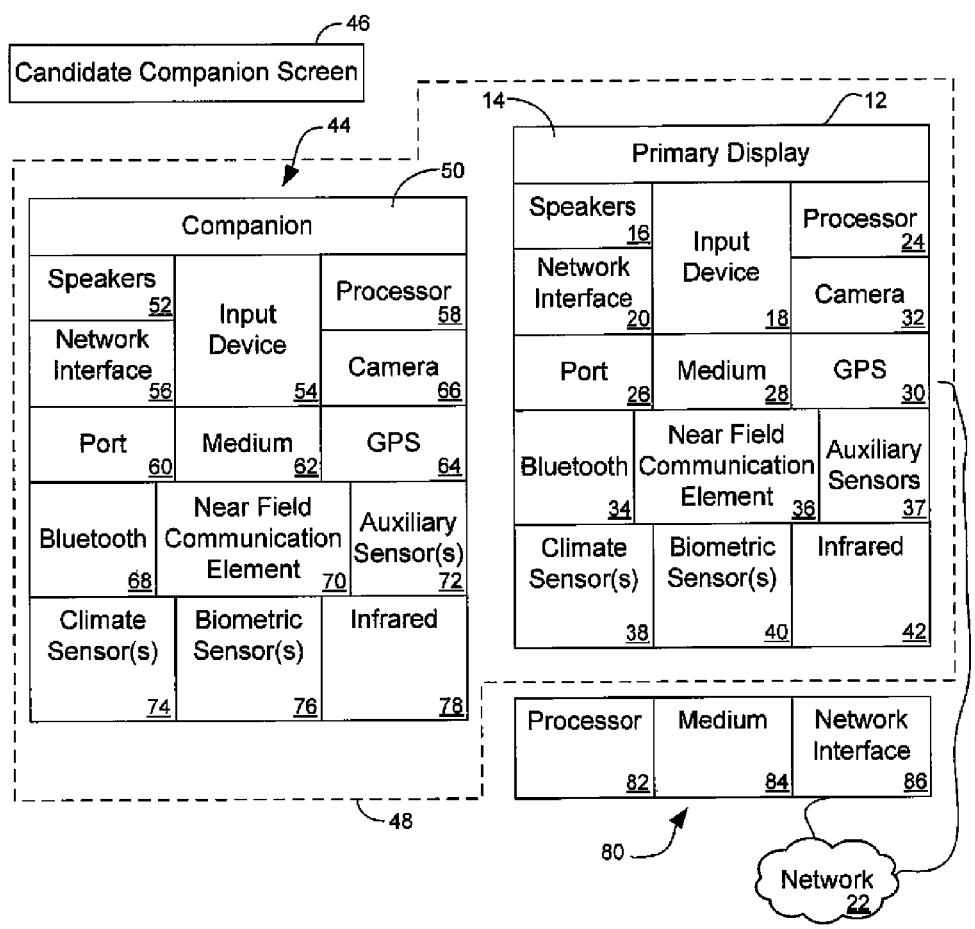
FIG. 1 is a block diagram of an example system in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USE port to physically connect (e.g. using a wired connection) to another CE device and/or a headphone port to connect headphones to the AVDD 12 for presentation of audio from the AVDD 12 to a user through the headphones. The AVDD 12 may further include one or more tangible computer readable storage medium 28 such as disk-based or solid state storage. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth module 34 and other Near Field Communication (NFC) element 36 for communication with other devices using Bluetooth and/or NFC technology, respectively. An example NFC element can be a radio frequency identification (RFID) element. Note that the elements 34, 36, like other appropriate elements herein described, may be incorporated within a housing or chassis of the associated device or be provided as a universal serial bus (USB) 2/3 dongle device. With respect to the Bluetooth module 34, it may be implemented as a Bluetooth Low Energy (BLE) module and/or a Bluetooth 4.0 module that implements communications using one or more of BLE systems and/or standard Bluetooth systems.

In addition to the foregoing, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture commands), etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types that may establish companion screen devices for the primary display device established by the AVDD 12. In one example, a first companion screen device is established by a first CE device 44 while a second companion screen device may be established by a second CE device 46 which may include similar components as the first CE device 44 and hence will not be discussed in detail. In the example shown, only two CE devices 44, 46 are shown as companion screen devices, it being understood that only one companion screen device or more than two companion screen devices may be used.

In the example shown, to illustrate present principles all three devices 12, 44, 46 are assumed to be members of a home entertainment network in a dwelling or at least to be present in proximity to each other in a location such as a house. However, for illustrating present principles the first CE device 44 is assumed to be in the same room as the AVDD 12, bounded by walls illustrated by dashed lines 48, whereas the second CE device 46 is not in the same room.

The example non-limiting first CE device 44 may be established by any one of the above-mentioned devices and accordingly may have one or more of the components described below. Specifically, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. detecting audio from the AVDD 12 in accordance with present principles and/or entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, it also includes one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles (e.g. to gather images presented on the display 14 of the AVDD 12).

Also included on the first CE device 44 may be a Bluetooth module 68 and other Near Field Communication (NFC) element 70 for communication with other devices using Bluetooth and/or NFC technology, respectively. An example NFC element can be a radio frequency identification (RFID) element. The Bluetooth module 68 may be substantially similar in configuration and use to the Bluetooth module 34 of the PDD.

Further still, the first CE device 44 may include one or more auxiliary sensors 72 (e.g., a motion sensor such as an accelerometer, gyroscope, cyclometer, or a magnetic sensor, an infrared (1R) sensor, an optical sensor, a speed and/or cadence sensor, a gesture sensor (e.g. for sensing gesture commands), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The second CE device 46 may include some or all of the components shown for the CE device 44.

A server 80 is also shown as being a part of the system 10. The server 80 includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. It is to be understood that the server 80 is capable of receiving data such as e.g. images of content and/or audiomarks of content, undertaking a search for ancillary content associated with the content from which the data was taken, and provide information regarding the ancillary content and/or provide the ancillary content itself to e.g. the CE device 44 in accordance with present principles.

Accordingly, in some embodiments the server 80 may be an Internet server, and may also include and perform "cloud" functions such that the devices of the system 10 may access a "cloud" environment via the server 80 in example embodiments.

Figure 2A:
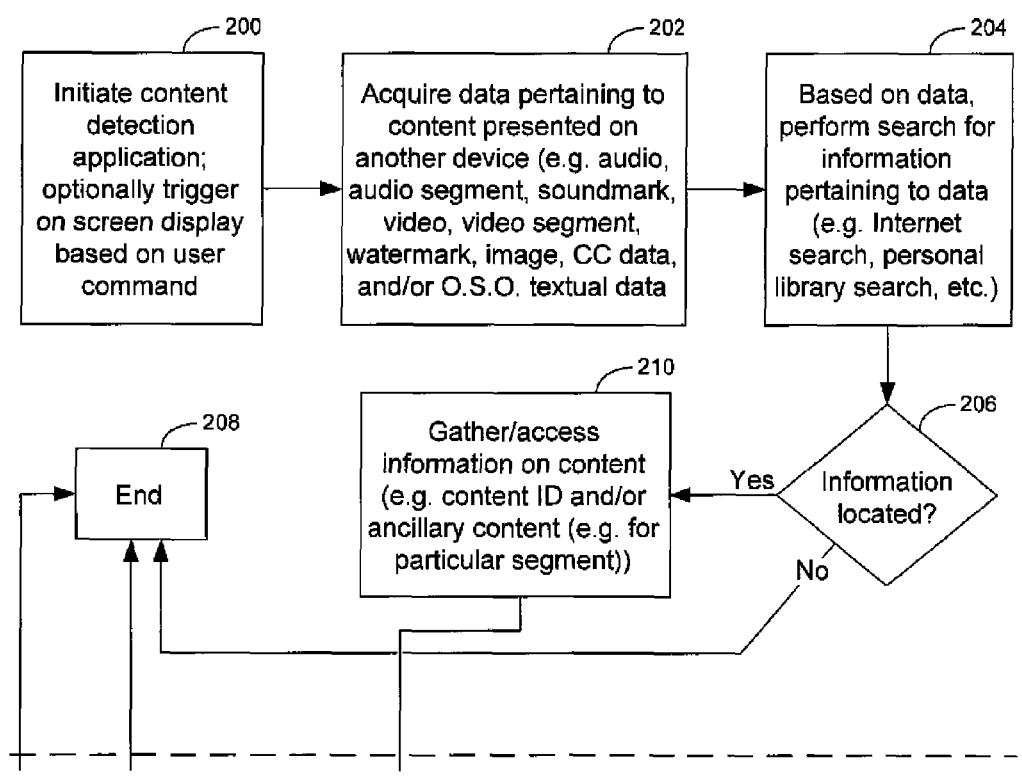
FIGS. 2A and 2B are flow charts showing example algorithms according to present principles.
Figure 2B:
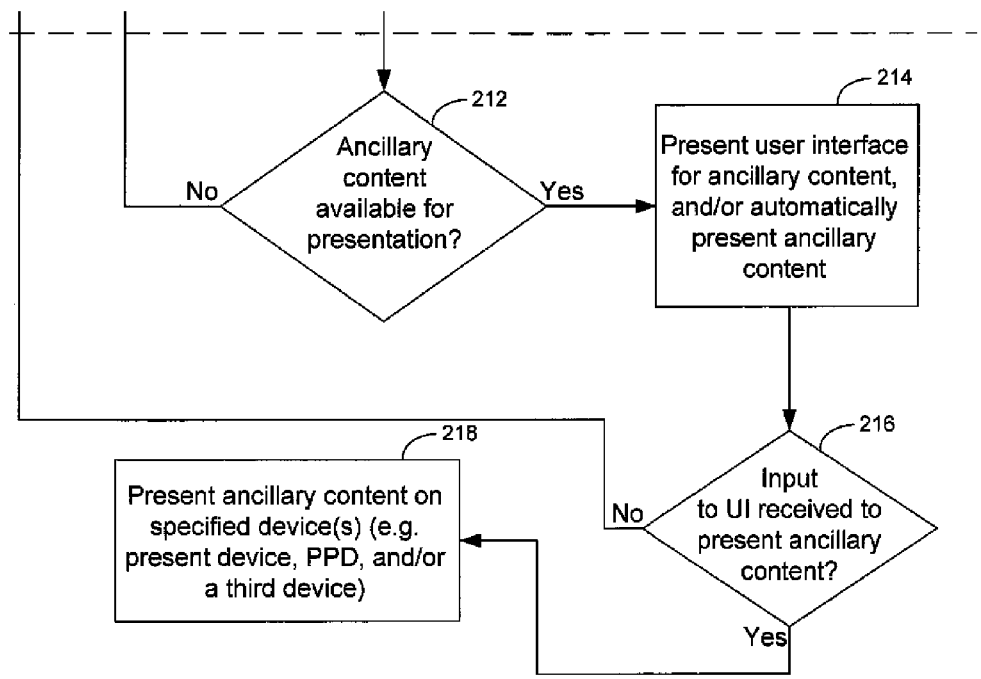

FIGS. 2A and 2B jointly show overall logic according to present principles. Beginning at block 200 as shown in FIG. 2A, the logic initiates a content detection application at a first device such as e.g. a companion screen device. Initiation of the application may occur e.g. automatically at startup of the device undertaking the present logic (referred to below as the "present device") without further input from a user other than to initiate startup of the device itself, based on user invocation of the application based on e.g. selection of a icon associated with the application that is presented on a display of the present device or even another device to e.g. remotely activate the application at the present device, based on audio detected by the present device that is determined to not be a voice which the present device has been configured to recognize (e.g., not a voice of the present device's primary user), and/or based on detection using a camera on the present device of another CE device such as the AVDD 12 and/or a display of the AVDD 12 presenting (e.g. moving) images, etc. Regardless, note that also at block 200, in some embodiments the logic may trigger an on screen display (OSD) such as e.g. an electronic program guide (EPG) to be presented on a display of the AVDD 12. The OSD may be triggered from the present device e.g. over network communication with the AVDD 12, based on an IR signal sent from the present device and received by an IR transceiver on the AVDD 12, etc.

From block 200 the logic proceeds to block 202 where the logic acquires or otherwise detects and/or collects data pertaining to "primary" content presented on the AVDD 12. Such data may include but is not limited to audio data (e.g. a single tone, an audio segment, audio "snippet," and/or an audiomark in the audio of content presented on the AVDD 12, etc.), image data (e.g. a still image (e.g. of video), a video, a video segment, a video "snippet," a watermark on at least one image of the content being presented on the AVDD 12, etc.), both audio and image data, and/or textual data (e.g. pertaining to closed captioning presented on the AVDD 12 and/or pertaining to text information presented on the OSD e.g. if triggered at block 200), etc. Note that the logic may acquire or otherwise collect or determine text presented on the AVDD 12 based on e.g. optical character recognition (OCR) based on signals received from the device's camera pertaining to the text as detected by the camera.

After block 202, the logic proceeds to block 204 where the logic, based on the data that was acquired or otherwise detected, performs a search for information pertaining to the data such as e.g. the identity of the content presented on the AVDD 12 (e.g. the name of the content). Thus, in some embodiments the search may be an Internet search (e.g., the data may be entered into an Internet search engine), although it is to be understood that still other searches may be used in addition to or in lieu of an Internet search such as e.g. a search of a local storage medium of the present device, the AVDD 12, and/or even e.g. a storage medium providing the content presented on the AVDD 12.

Furthermore, in some embodiments the search conducted at block 204 may be e.g. a search of an image and/or audio acquired at block 202 such as e.g. an Internet image search, an Internet audio search, a search of a audiomark and/or watermark detected at block 202, and/or a search for text e.g. matching at least a portion of the text detected as being presented on the display of the AVDD 12 (e.g. a search for consecutive characters and/or words matching at least a portion of the detected closed captioning text and/or on screen display text). From block 204 the logic proceeds to decision diamond 206, at which the logic determines whether information pertaining to the data has been located based on the one or more searches described above. A negative determination causes the logic to move to block 208 where the logic ends.

However, an affirmative determination at diamond 206 instead causes the logic to proceed to block 210 where the logic gathers and/or otherwise accesses the information on the content (e.g. based on links and/or information returned as search results). Such information may be e.g. the identity of the content, which may then be used to determine if ancillary content is available. However, note that in some embodiments the information may also be content including but not limited to e.g. statistics regarding the content and/or a subject of the content (e.g. the content may be a broadcast of a professional sporting event, and thus the information may pertain to game and/or player statistics), metadata regarding the content (e.g. content runtime, actors and/or actresses involved in the production of the content, location(s) at which the content was produced, etc.), advertisements related to the content, still other ancillary content such as e.g. audio video content related to but different from the content presented on the AVDD 12 such as e.g. cast and crew interviews involving the making of the content, a sequel to the content, etc.

In any case, from block 210 the logic proceeds to decision diamond 212 (shown in FIG. 2B) where the logic determines based on the information (e.g. based on the identity of the content) whether ancillary content related to the primary content presented on the AVDD 12 is available for presentation on the present device (e.g., if such ancillary content was not already accessed based on the search performed at block 204). Thus, at diamond 212 another search may be conducted in accordance with present principles based on the information gathered and/or accessed at block 210. Furthermore, also at diamond 212 even if ancillary content has already been identified it may be determined whether the present device is able to access the ancillary content (e.g., if the content requires input of a username and password to a content subscription service). A negative determination at diamond 212 causes the logic to end at block 208.

However, an affirmative determination at diamond 212 instead causes the logic to proceed to block 214 where the logic presents a user interface (UI) on the display of the present device that is manipulable to issue a command to the present device, the AVDD 12, and/or one or more other devices (e.g. with which the present device is communicatively connected over a network) to present the ancillary content. Note that the UI may itself also contain information regarding the ancillary content, such as e.g. the subject matter of the ancillary content or even simply that ancillary content exists. In addition to or in lieu presenting a UI, but also at block 214, the logic may automatically without further user input begin presenting the ancillary content on the present device (and/or the AVDD 12 and/or a third device, depending on e.g. user settings).

From block 214 the logic proceeds to decision diamond 216, at which the logic determines whether input to the UI has been received e.g. to present the ancillary content (e.g., in instances where the ancillary content was not automatically presented at block 214). A negative determination causes the logic to revert back to block 208, but an affirmative determination at diamond 216 causes the logic to instead proceed to block 218, where the logic presents the ancillary content on one or more devices indicated by a user (e.g., based on device and/or network presets, and/or based on input to the UI presented at block 214) responsive to the determination that input to the UI to present the ancillary content has been received.

Figure 3:
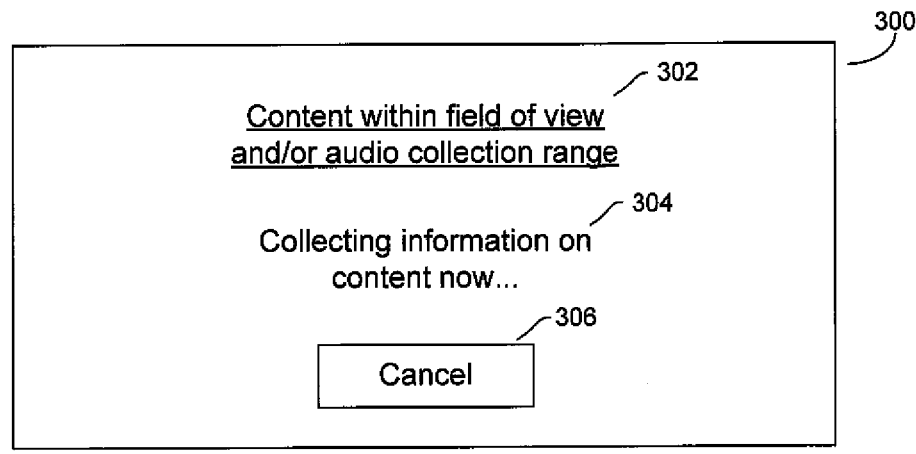
FIGS. 3-8 are example user interfaces (UIs) according to present principles.

Continuing the detailed description in reference to FIG. 3, it shows an example user interface (UI) 300 presentable on a companion screen device such as e.g. the CE device 44 responsive to the companion screen device detecting content (e.g. using a content detection application) being presented on a primary display device, such as e.g. the AVDD 12. Thus, it may be appreciated that the two devices are in relatively close proximity (e.g. within the same room of a structure) for the companion screen device to detect video being presented on the primary display device (e.g., using a camera on the companion screen device), detect audio being presented on the primary display device (e.g. using a microphone on the companion screen device), and/or detect text being presented on the primary display device (e.g. using a camera on the companion screen device).

In any case, the UI 300 includes an indication 302 that primary content has been detected as being within a detectable "filed of view" e.g. of a camera of the companion screen device and/or within a detectable audio range. The UI 300 also includes an indication 304 that the companion screen device is currently collecting information on the primary content in accordance with present principles. In addition to the foregoing, the UI 300 may also include a cancel selector element 306 selectable to automatically without further user input cause the companion screen device to cease collecting information on the primary content (e.g. should the user not wish to view any possible ancillary content that may be available).

Figure 4:
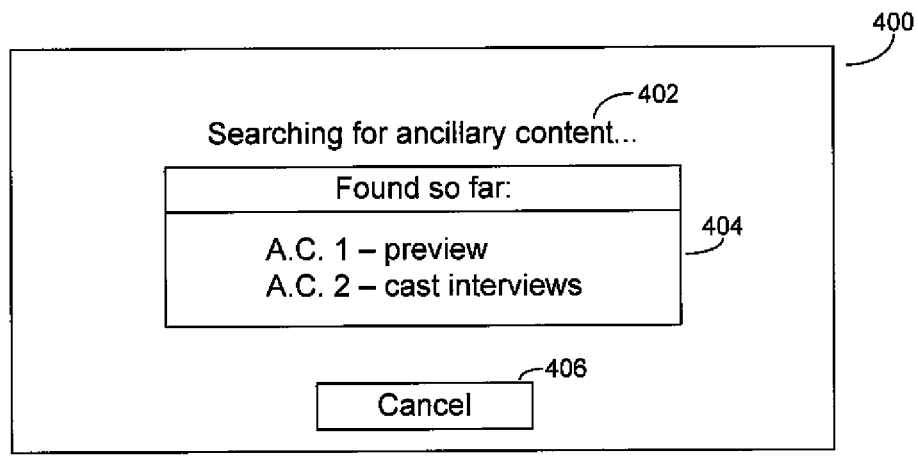

Once at least some information has been located that is related to the primary content, the UI 400 of FIG. 4 may be presented on the companion screen device. The UI 400 includes an indication 402 that the companion screen device is still searching for information and/or ancillary content related to the primary content presented on the primary display device. However, the UI 400 also includes a listing 404 of one or more pieces of content that have already been located by the companion screen device during the search. It is to be understood that even while the search by the companion screen device is still ongoing as reflected by the indication 402, any of the ancillary contents in the listing 404 may be selected to automatically without further user input cause the companion screen device to begin presenting the content associated with the selection from the listing 404. Also note that that each of the ancillary contents in the listing 404 may include not just an indication and/or name of the ancillary content, but also a summary and/or description of the ancillary content, such as the ancillary content being a preview and/or trailer of the primary content, interviews of cast members involved in the production of the ancillary content, etc. Last, note that the UI 400 may include a cancel selector element 406 selectable to automatically without further user input cause the companion screen device to cease searching for ancillary content.

Figure 5:
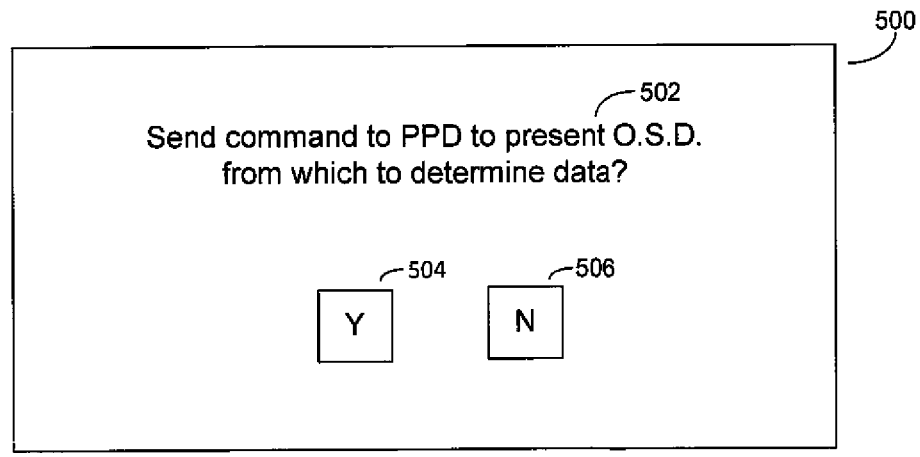

Before describing a UI that may be presented after conclusion of a search for ancillary content in accordance with present principles, reference is first made to the UI 500 shown in FIG. 5. As mentioned above, in some embodiments the companion screen device may trigger an on screen display (OSD) such as e.g. an electronic program guide (EPG) to be presented on the primary display device by e.g. sending an RF command from the companion screen device to the primary display device for the primary display device to present the OSD. In any case, it is to be understood that the UI 500 may be presented automatically without user input e.g. responsive to detection by the companion screen device of content within its detectable "filed of view" and/or within its detectable audio range. However, the UI 500 may also be presented responsive to a user command to change settings for a content detection application of the companion screen device.

Regardless, the UI 500 includes a prompt 502 asking whether the companion screen device should send a command to the primary display device to present an on screen display (OSD) on the primary display device from which the companion screen device may gather or otherwise determine data that may then be used in a search for ancillary content in accordance with present principles. Accordingly, a yes selector element 504 is shown and may be selectable to automatically without further user input cause the device to transmit such a command to the primary display device, detect e.g. text, and then locate ancillary content. A no selector element 506 is also shown, which may be selectable to decline to cause the companion screen device to transmit the command.

Figure 6:
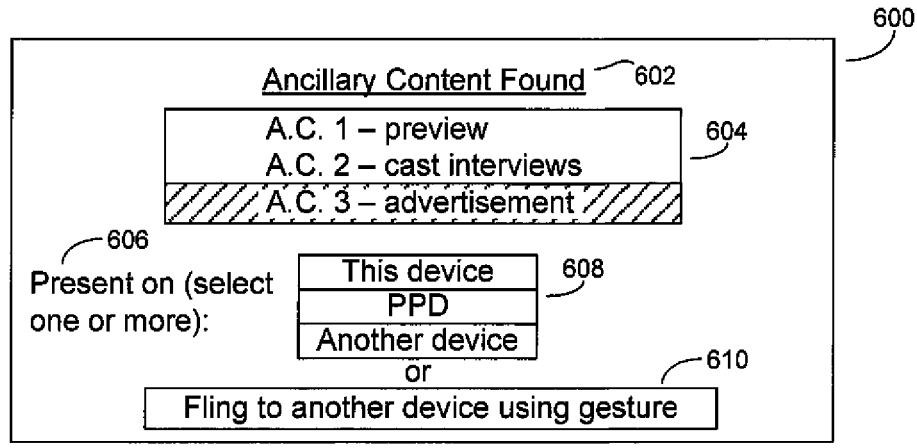

Reference is now made to the UI 600 of FIG. 6, which may be presented e.g. after conclusion of a search for ancillary content in accordance with present principles where the search returned at least one result for ancillary content. The UI 600 includes an indication 602 that ancillary content has been located, along with a listing 604 of one or more pieces of content that have been located by the companion screen device during the search. It is to be understood that the ancillary contents denoted by selector elements in the listing 604 may be selectable to automatically without further user input cause the companion screen device to begin presenting the ancillary content associated with the selected element from the listing 604. Note that that each of the ancillary contents in the listing 604 may include not just an indication and/or name of the ancillary content, but also a summary and/or description of the ancillary content, such as the ancillary content being a preview and/or trailer of the primary content, interviews of cast members involved in the production of the ancillary content, an advertisement pertaining to the ancillary content, etc.

In addition to the foregoing, the UI 600 also includes a device selection section including a prompt 606 for a user to select one or more of the selector elements in the listing 608 to automatically without further user input responsive thereto cause the companion screen device to cause the device associated with the selected one of the elements in the listing 608 to begin presenting the ancillary content. As may be appreciated from FIG. 6, the ancillary content in the listing 604 for Ancillary Content Three (an advertisement) is shaded to denote it has been selected by a user, and thus whichever one or more devices denoted in the listing 608 that are selected by the user based on selection of the associated element in the listing 608 will be caused to automatically begin presenting the Ancillary Content Three advertisement. However, note that a selector element 610 is also shown on the UI 600, which is selectable to automatically cause the companion screen device to begin detecting for a gesture (e.g. gesture in free space as detected by a camera on the companion screen device, two-dimensional directional gesture to the touch-enabled display of the companion screen device, etc.) from a user toward another device with which the companion screen device is configured to communicate to thus "fling" the selected content (e.g. in this case Ancillary Content Three) to the gestured-to device such that it may automatically without further user input be presented on the gestured-to device.

Figure 7:
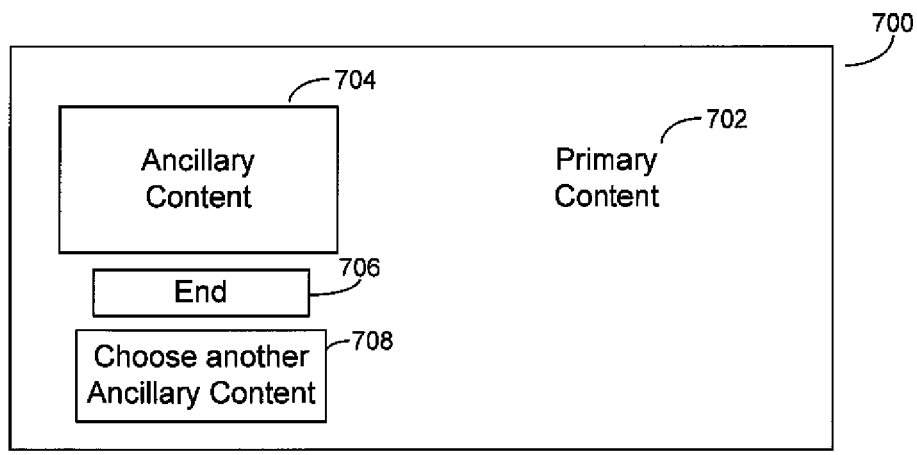

Now in reference to FIG. 7, it shows a UI 700 that may be presented on any device selected (e.g. by a user) as being a device on which to present ancillary content in accordance with present principles. Thus, it is to be understood that the UI 700 may be presented on a primary display device, companion screen device, and/or still another device. In embodiments where the UI 700 is presented on a device also presenting primary content from which data was collected to determine ancillary content, the primary content 702 may continue to be presented even as e.g. ancillary content 704 is presented in a picture-in-picture format.

In addition to the foregoing, the UI 700 may also include an end selector element 706 selectable to automatically without further user input responsive thereto cause the device presenting the UI 700 to cease presenting the ancillary content 704. Still another selector element 708 is shown on the UI 700, which is selectable to automatically without further user input responsive thereto cause the UI 700 to present a listing (e.g. similar to the listing 604 described above) from which the user may select another ancillary content to be presented on the UI 700.

Figure 8:
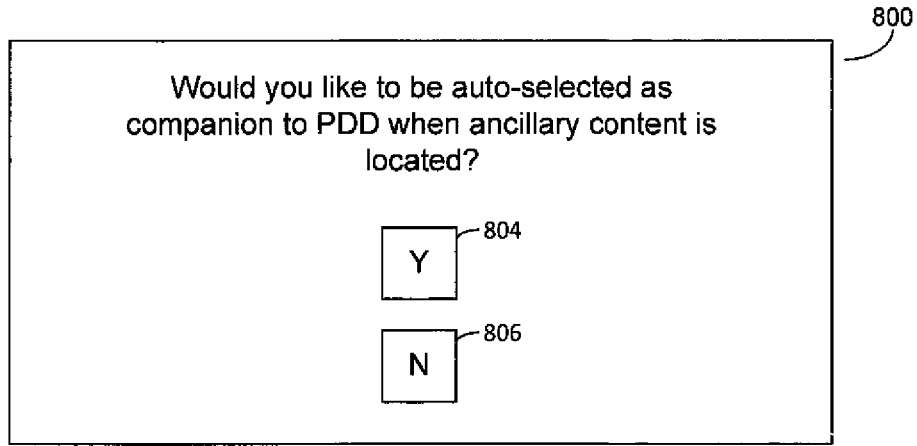

Continuing the detailed description now in reference to FIG. 8, it shows a UI 800 that may be presented on a companion screen device to configure its ancillary content presentation settings in accordance with present principles. Thus, the UI 800 includes a prompt 802 for whether the companion screen device on which the UI 800 is presented should automatically without user input be selected as a companion screen device to a primary display device presenting primary content when ancillary content is located. Selection of the yes selector element 804 causes the companion screen device to thereafter be configured to automatically without user input present ancillary content that itself may be located automatically without user input based on detection e.g. by a content detection application on the companion screen device of primary content being presented on another device in accordance with present principles. Note that the UI 800 also includes a no selector element 806 selectable to decline to configure the companion screen device to automatically present ancillary content.

Without reference to any particular figure, it is to be understood that the audiomarks referenced herein may in non-limiting embodiments be e.g. a recognizable and/or predetermined sound or tone, or sequence of sounds or tones, and/or audio content that need not necessarily be words of any language and/or need not necessarily be melodic. Moreover, such audiomarks may not necessarily even be detectable to humans based on their normal sensory perceptions, but may still be detectable by the companion screen device in accordance with present principles. E.g., a relatively high pitched sound may be outside the hearing range of a person but may nonetheless be detectable by a microphone of the companion screen device and thus be used an audiomark from which a search may be conducted. E.g., a search may be conducted based on the precise pitch of the audiomark, based on a particular sequence of tones, based on a series of tones establishing a message in Morse code including data regarding the content, etc.

Also without reference to any particular figure, it is to be understood that when e.g. searching based on data from a particular segment of content (e.g. an audio segment, video segment, and/or AV segment), a search for information and/or ancillary content may be conducted such that results are returned not for the content as a whole but for information and/or ancillary content specifically pertaining to or otherwise associated with the particular segment. Thus, e.g., a search for ancillary content based on a segment of audio that is a particular actor speaking may return results pertaining to that specific actor and not any other actors or actresses in the content. As another example, a search for ancillary content based on a video segment showing at least portions of a particular location at which the content was filmed may return results pertaining to the history of that particular location whether directly related to the topic of the content itself or not.

Note that present principles also recognize that once ancillary content has been located e.g. by a companion screen device in accordance with present principles, the ancillary content may be presented on another device (e.g. either the PPD or still another device) by e.g. flinging the content as described herein or by otherwise providing a network link to the content to the other device(s), and/or by streaming the ancillary content directly from the companion screen device to the other device(s) or from the ancillary content provider to the other device(s) based on the identification of a link to the ancillary content, and/or by causing the other device to automatically download the ancillary content from a content source such as a TV station (via cable, satellite, or over the air broadcast), computer network source (e.g. cloud storage, a server), etc. without further user interaction.

Still without reference to any particular figure, it is to be understood that when a companion screen device e.g. commands a device other than the PPD to present ancillary content that has been located, a user manipulating a UT at the companion screen device may select a selector element for causing the ancillary content not only to be presented on the other device but also e.g. to power on the other device and/or power on its display in particular so that it may present the ancillary content.

Present principles may also be applied in instances where e.g. a user may select secondary and/or ancillary content presented to the user by selecting that particular secondary content from a guide and/or UI listing the secondary content on the PPD and/or CSD. Accordingly, a determination and/or identification of secondary and/or ancillary content may then cause one or both of the PPD and/or CSD to generate and/or present a UI listing the one or more ancillary contents available for presentation (e.g. with each entry on the listing pertaining to a different ancillary content including a selector element selectable to automatically without further user input responsive thereto initiate presentation of the ancillary content on the e.g. CSD, and with each entry including information on the respective ancillary content such as e.g. title, date of release, how it pertains to the primary content, actors in the respective ancillary content, run time of the respective ancillary content, etc.). E.g., a system may generate an on-screen guide of secondary and/or ancillary contents related to a particular television show (e.g. the primary content in this example) that was identified in accordance with present principles. Furthermore, such a UI and/or guide may also in some embodiments e.g. present content unrelated to the primary content such as other content from a content provider that is available for presentation at the current time the UI is accessed.

Furthermore, present principles recognize that although e.g. a software application for undertaking present principles may be vended with a device such as the CE device 44, it is to be understood that present principles apply in instances where such an application is e.g. downloaded from a server to a CE device over a network such as the Internet.

It may now be appreciated that e.g. an application running on a mobile device, cellphone, or tablet may capture video and/or audio of content being presented on another device such as e.g. a "big screen" TV, and that the captured information may be sent over the Internet for recognition. The application may then receive "second screen" data related to what is being shown on the primary screen such as but not limited to data regarding sports statistics, information about actors or locations, advertisements, etc.

In some embodiments an audiomark and/or watermark (e.g. in one or more images and/or frames of a video stream) may be included in the primary content by e.g. the content's creator and/or provider. Furthermore, present principles recognize that such a mobile device may trigger an on-screen-display (OSD) to be presented on the primary display device using an "info" or "channel up/down" Infrared command. The OSD can be captured by the mobile device using optical character recognition (OCR) on a web server. See, e.g., U.S. Pat. Nos. 8,621,498, 8,438,589, 8,320,674, 8,296,808, 8,079,055, 7,689,613, all of which are incorporated herein by reference.

Thus, a mobile device acting on its own in a home network may in accordance with present principles be able to determine what primary content is playing and present companion screen data. Recognition can be accomplished by identifying the primary content through snippets of the content (video and/or audio), by "watermarks" of the audio and/or video, and/or by OCR of text that is detected that may help identify the primary content. An application for such purposes running on the mobile device may then "companion-screen" content related to the primary content. Thus, upon recognizing the content, the mobile device may be configured to present companion screen information using its own respective Internet connection. Using an audio and/or video snippet, the mobile device may determine where in the media the content is currently being presented as well to thus present ancillary content specifically related to the currently-presented portion.

While the particular PRESENTATION OF CONTENT ON COMPANION DISPLAY DEVICE BASED ON CONTENT PRESENTED ON PRIMARY DISPLAY DEVICE is herein shown and described in detail, it is to be understood that the subject matter which is encompassed by the present invention is limited only by the claims.

What is claimed is:

1. A first device, comprising:
at least one computer display, the first device being a mobile communication device (MCD);
at least one computer memory comprising instructions executable by at least one processor of the MCD to:
receive a user command;
responsive to the user command, trigger an on-screen-display (OSD) to be presented on a second device, the second device being a primary display device (PDD) adapted to present first content;
search for second content related to but different from the first content;
present the second content on the MCD, the second content being ancillary content to the first content;
present at least one first user interface (UI) on the MCD including a listing of one or more pieces of second content that have been located during the search, second content denoted by respective selector elements in the listing being selectable to automatically without further user input cause the MCD to begin presenting the second content associated with a selected element from the listing, the first UI also including a device selection section including a prompt for a user to select one or more of the selector elements in the listing, the first UI also including a fling selector element selectable to cause the MCD to, responsive to a fling command or gesture, second content selected from the listing to a target device such that the second content automatically without further user input is presented on the target device;
wherein when the target device is the PDD, the PDD presents the first content simultaneously with presenting second content in a second UI, the second UI including functionality to cause the PDD to cease presenting the second content, the second UI including functionality to present a listing from which another second content can be selected for presentation;
the instructions being further executable to present:
a prompt for whether the MCD should automatically without user input be selected as a companion screen device to the PDD such that the MCD can be configured to automatically present second content based on detection of first content being presented on another device.

2. The first device of claim 1, wherein the instructions are further executable to:
responsive to receiving the command at the second device based at least in part on manipulation of a user interface (UI) presented responsive to identification of the second content, present the second content on the first device or the second device.

3. The first device of claim 1, wherein the command is a first command, and wherein the instructions are further executable to:
responsive to receiving a second command at the second device, present the second content on a third device different from the first device and different from the second device.

4. The first device of claim 2, wherein the UI includes at least a first selector element associated with content unrelated to the first content and unrelated to the second content that is selectable to present the content associated with the first selector element, the UI further including the at least a second selector element selectable to issue the command to at least one of the first and second devices to present the second content.

5. The first device of claim 1, wherein the instructions are executable to:
capture an image of an on-screen-display (OSD) to be presented on the PDD;
send the image to a computer network server for executing optical character recognition (OCR) on the image to identify information pertaining to first content;
at least in part based on the information, identify the second content related to but different from the first content; and wherein the data is acquired at least in part based on at least one image of the first content detected by a camera on the first device.

6. The first device of claim 5, wherein the determination of information pertaining to the first content includes determining the identity of the first content based on the data.

7. The first device of claim 5, wherein the determination of information pertaining to the first content is at least in part based on an Internet search using at least a portion of the data.

8. The first device of claim 7, wherein the Internet search using at least a portion of the data is an Internet search of at least one image of the first content gathered by a camera on the first device.

9. The first device of claim 5, wherein the acquisition of data includes acquiring data pertaining to a watermark, the watermark included on at least one image of the first content presented on the second device.

10. The first device of claim 5, wherein the acquisition of data includes acquiring data pertaining to an audiomark in audio of the first content.

11. The first device of claim 5, wherein the data pertains to text associated with the first content, wherein the text is presented on the second device, and wherein the text is acquired based at least in part on optical character recognition.

12. The first device of claim 11, wherein the text is presented on an on screen display (OSD) of the second device.

13. The first device of claim 11, wherein the text is of closed captioning of the first content.

14. A method, comprising:
initiating a data collection application at a companion device (CD);
executing the data collection application to receive from the CD a command;
responsive to the command, triggering an on-screen-display (OSD) to be presented on a second device, the second device being a primary display (PDD) adapted to present first content, the PDD being different from the CD;
searching for second content related to but different from the first content;
presenting the second content on the CD, the second content being ancillary content to the first content;
presenting at least one first user interface (UI) on the CD including a listing of one or more pieces of second content that have been located during the searching for second content, second content denoted by respective selector elements in the listing being selectable to automatically without further user input cause the CD to begin presenting the second content associated with a selected element from the listing, the first UI also including a device selection section including a prompt for a user to select one or more of the selector elements in the listing, the first UI also including a fling selector element selectable to cause the CD to, responsive to a fling command or gesture, second content selected from the listing to a target device such that the second content automatically without further user input is presented on the target device;

wherein when the target device is the PDD, the method comprises presenting on the PDD the first content simultaneously with presenting second content in a second UI, the second UI including functionality to cause the PDD to cease presenting the second content, the second UI including functionality to present a listing from which another second content can be selected for presentation; and prompting for whether the CD should automatically without user input be selected as a companion screen device to the PDD such that the CD can be configured to automatically present second content based on detection of first content being presented on another device.

15. The method of claim 14, wherein a user interface (UI) presented responsive to identification of the second content is manipulable to present the second content on the first device.

16. The method of claim 14, comprising:
using the MCD to capture an image of the OSD;
executing optical character recognition (OCR) on the image to identify information pertaining to first content;
at least in part based on the data, identifying the second content; and
without input from a user, presenting the second content, the second content being ancillary content to the first content, wherein the data pertaining to the first content is data pertaining to a first portion of audio of the first content, of video of the first content, or of audio and video of the first content; and
wherein the second content contains information regarding the first portion but not information regarding a second portion of the first content that is different from the first portion.

17. A computer memory that is not a transitory signal and that comprises instructions executable by at least one processor of a companion device (CD) to:
receive from a user input element on the first device a command;
responsive to the command, trigger an on-screen-display (OSD) to be presented on a second device, the second device being a primary display device (PDD);
present at least one first user interface (UI) on the CD including a listing of one or more pieces of second content that have been located during a search, second content denoted by respective selector elements in the listing being selectable to automatically without further user input cause the CD to begin presenting the second content associated with a selected element from the listing, the first UI also including a device selection section including a prompt for a user to select one or more of the selector elements in the listing, the first UI also including a fling selector element selectable to cause the CD to, responsive to a fling command or gesture, second content selected from the listing to a target device such that the second content automatically without further user input is presented on the target device;
wherein when the target device is the PDD, the PDD presents the first content simultaneously with presenting second content in a second UI, the second UI including functionality to cause the PDD to cease presenting the second content, the second UI including functionality to present a listing from which another second content can be selected for presentation; and
prompt for whether the CD should automatically without user input be selected as a companion screen device to the PDD such that the CD can be configured to automatically present second content based on detection of first content being presented on another device.

18. The computer readable storage medium of claim 17, wherein the instructions when executed by the processor configure the processor to identify the second content based at least in part on an Internet search of at least a portion of the data.

19. The computer readable storage medium of claim 17, wherein the second content is ancillary content to the first content, and the instructions are executable to:
capture an image of the OSD;
based on executing optical character recognition (OCR) on the image, presenting the listing.

* * * * *